Dec. 25, 1934.  A. G. HEGGEM  1,985,449
VALVE
Filed Dec. 16, 1932  6 Sheets-Sheet 1

Dec. 25, 1934.  A. G. HEGGEM  1,985,449

VALVE

Filed Dec. 16, 1932  6 Sheets-Sheet 2

Dec. 25, 1934.  A. G. HEGGEM  1,985,449
VALVE
Filed Dec. 16, 1932  6 Sheets-Sheet 3

Patented Dec. 25, 1934

1,985,449

UNITED STATES PATENT OFFICE 1,985,449

VALVE

Alfred G. Heggem, Tulsa, Okla.

Application December 16, 1932, Serial No. 647,643

8 Claims. (Cl. 251—102)

My invention relates to valves for controlling the flow of fluids. The principal object of the invention is to provide a simple and efficient structure for the purpose intended wherein the sequence of operation of the parts during the opening and closing of the valve is performed with precision and certainty.

A principal feature of the invention consists in constructing the valve with a body having an inlet opening and an outlet opening and a chamber communicating with said openings, and in combining therewith means for controlling the flow of fluid through said openings, said means including a rotatable member formed with a trunnion, a valve plate carried by said rotatable member and radially movable with respect thereto, a stem member capable of rotation with respect to said valve body and said rotatable member and having a socket for receiving the said trunnion and also being provided with an eccentric adjacent said socket, means actuated by said eccentric for shifting the valve plate radially with respect to the rotatable member by which it is carried, a latch movably mounted on the rotatable member for preventing rotation of the latter with respect to the valve body during radial movement of the valve plate, and means movable with the stem and located between the eccentric and the outer end of the stem for cooperating with the latch and being provided at its inner end with an eccentric, means actuated by said eccentric for moving the valve plate with respect to said rotatable member, and means for releasably locking said rotatable member to the valve body, said last-named means including an arcuate member concentric with the stem and a movable locking device carried by said rotatable member and cooperating with said arcuate member, said arcuate member being rigidly connected to the stem and being positioned between said eccentric and the outer end of the stem.

Another primary feature of the invention consists in constructing the valve with a body having an inlet opening and an outlet opening and a chamber communicating with said openings, and in providing means for controlling the flow of fluid through said openings, said means including a rotatable member having oppositely disposed trunnions integrally united thereto, a stem rotatable with respect to the valve body and to said rotatable member as well, a valve plate carried by and radially movable with respect to said rotatable member, means cooperating with the stem for actuating said rotatable member, a cover plate for the chamber of the valve body, and means operated by the rotation of the stem for shifting the valve plate radially with respect to said rotatable member and the valve body, the cover plate being provided on its inner side with a hub portion which overlaps the adjacent trunnion in the direction of length of the latter to afford support therefor.

A still further feature of the invention consists in forming the valve with a body having an inlet opening and an outlet opening and a chamber communicating with said opening, and in providing means for controlling the flow of fluid through said openings, which means include a rotatable member disposed within the chamber, a valve plate mounted upon and radially movable with respect to said rotatable member, a stem capable of rotation both with respect to said rotatable member and the valve body, a lever operating to shift the valve plate radially with respect to the rotatable member, a plurality of links disposed on opposite sides of the valve plate and cooperating with the lever, and an eccentric rotatable by said stem and cooperating with one of said links.

Other features of the invention residing in particular combinations of parts and advantageous details of elemental construction will hereinafter appear and be particularly pointed out in the claims.

In the drawings illustrating preferred forms of construction,—

Figures 24, 25, 26, 27, 28, 29, 30, 31:
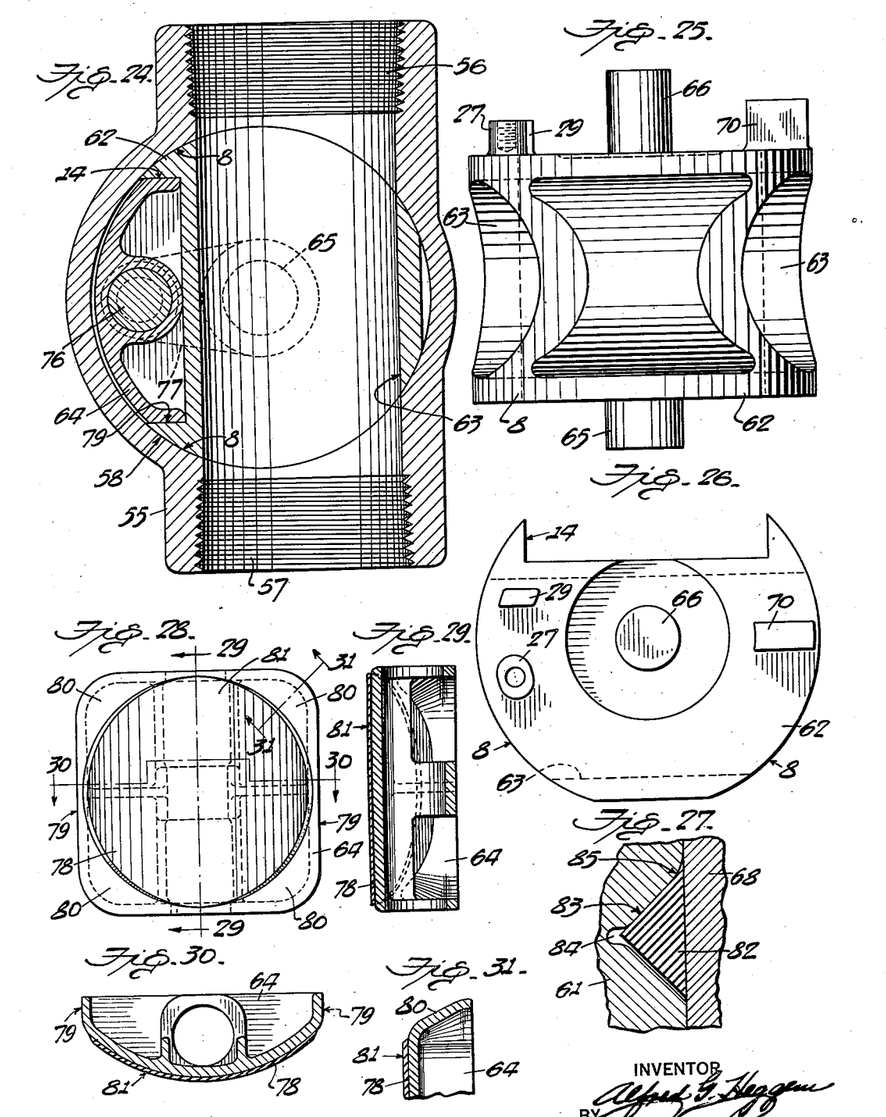
Figure 24 is a sectional view on the line 24—24, Figure 19.
Figures 25 and 26 are detail elevational views of the rotatable member upon which the valve plate is mounted.
Figures 27 is a detail sectional view illustrating a preferred mode of packing the valve stem.
Figure 28 is a detail elevational view of the valve plate, illustrating the application thereto of a yielding facing.
Figures 29, 30 and 31 are sections on the lines 29—29, 30—30 and 31—31, respectively, of Figure 28.

The drawings illustrate two forms of the invention, one employing a plurality of valve plates which respectively close the openings in the valve body for permitting the flow of fluid, and the other making use of but a single valve plate which serves to close one of the openings in the valve body through which the fluid passes. The valve in which a plurality of valve plates is employed is illustrated in Figures 1 to 18, inclusive, of the drawings, while the valve embodying but a single valve plate is illustrated in Figures 19 to 31, inclusive, of the drawings; but the structural features illustrated in Figures 16, 17 and 18 are common to both forms of the invention as herein illustrated and the construction illustrated in Figure 27 is alike applicable to both forms.

Figure 16:
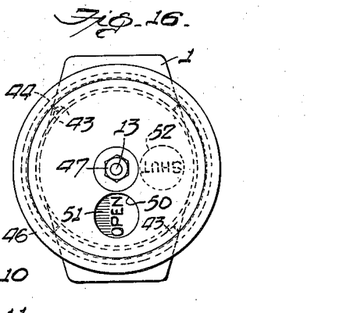
Figure 16 is an elevational view showing the position of the hand wheel with respect to the valve body when the valve is open.
Figure 17:
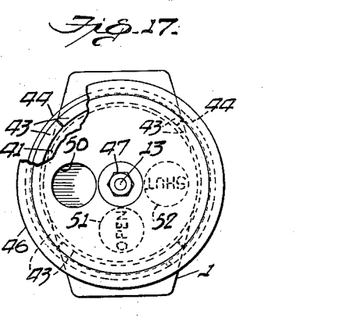
Figure 17 is an elevational view showing the relation of the hand wheel to the valve body when the valve parts occupy the position shown in Figures 2, 6 and 7.
Figure 18:
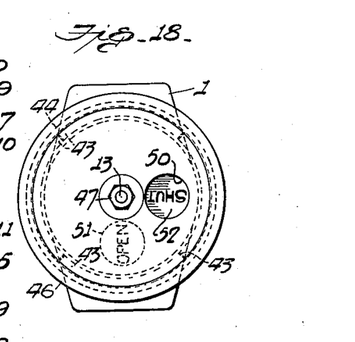
Figure 18 is an elevational view showing the position assumed by the hand wheel with respect to the valve body when the valve is fully closed.

In the form of the invention particularly illustrated in Figures 1 to 15 and in Figures 16, 17 and 18, the valve body 1 is provided with openings 2 and 3 respectively for the admission and escape of the fluid to be controlled by the valve, said openings being in communication with the cylindrical chamber 4 of the valve body. The valve chamber 4 is open at one side to permit the introduction of a rotatable member 5 upon which the valve plates 6 are mounted. The member 5 is formed with a passage 7 for permitting the flow of the fluid, the openings 2 and 3 into the valve body being preferably diametrically disposed, and the passage 7 through the rotatable core 5 being preferably cylindrical throughout and of a size corresponding to the openings 2 and 3 so as to afford a straight, uninterrupted passage for the fluid through the valve when the latter is open. The rotatable member 5 is provided with arcuate peripheral surfaces 8 which are cylindrically curved to correspond to the curvature of the cylindrical chamber 4 of the valve body, a slight clearance preferably being left between the adjacent cylindrical surfaces. For causing the core member 5 to rotate on an axis coincident with the axis of curvature of the cylindrical chamber 4 of the valve body, the core is preferably fashioned with oppositely projecting cylindrical trunnions 9 and 10, respectively, integrally united thereto. The trunnion 10 is received in a correspondingly curved socket 11 with which the valve body is provided on its interior, while the trunnion 9 fits into a correspondingly curved socket 12 formed in the rotatable valve stem 13 at its inner end. By this means the rotatable member 5 upon which the valve plates 6 are mounted is caused to rotate on an axis coincident with the axis of curvature of the valve chamber 4 during the opening and closing of the valve while thrusts due to fluid pressures are effectively transmitted from the rotatable member 5 to the valve body.

The valve plates 6 are mounted in oppositely disposed recesses 14 of the rotatable member 5 and are capable of radial movement therein so as to be projectable toward and retractible from their corresponding seats on the valve body. The movements of the valve plate 6 into engagement with the valve body as well as out of engagement therewith are effected by levers 15 which respectively cooperate with the valve plates. To this end each of the valve plates is preferably provided on its inner side with a loop or yoke 16 through which the adjacent lever 15 extends. The levers 15 are enlarged between their ends so as to be capable of rocking upon the inner surface of the adjacent loop 16 as well as upon the inner surface of the valve plate opposed to said loop. As shown in the drawings the levers may be advantageously formed with conical portions which taper in opposite directions from the point of maximum diameter of each lever toward its ends, the intersection of the conical portions being preferably somewhat rounded.

The inner ends of the levers 15 are preferably linked to the rotatable core member 5 by a bar 17 which extends in opposite directions from the axis of rotation of the core and thus in effect constitutes two links, each of which forms a fulcrum for one of the levers. Instead of rigidly affixing the bar 17 to the core member 5 the bar may advantageously be provided with a circular opening 18 for receiving the trunnion 10 of the core member, the bar being held against movement in the direction of length of the valve stem by reason of being interposed between the valve body 1 and the rotatable member 5. The bar or link member 17 is provided at its ends with circular openings 19 for respectively receiving the adjacent ends 20 of the levers 15, the ends 20 being formed with spherical or rounded surfaces to permit them to rock or fulcrum upon the link bar 17.

The opposite ends 21 of the levers are similarly formed with spherical or rounded surfaces and respectively extend into openings 22 of adjacent link members 23. The adjacent link members 23 respectively encircle and are actuated by eccentrics 24 and 25 which are rigid with the valve stem 13 and located at the inner end thereof, being preferably formed as integral parts of the stem. By overlapping the opposite ends of the valve plate 6, the link member 17 and the links 23 support the valve plates against movement in the direction of the axis of rotation of the core member 5, notwithstanding that the recesses 14 in the rotatable core member are open from end to end.

To insure that the elements of the mechanism shall perform their functions with precision and in proper sequence, thus preventing the possibility of sticking or jamming of the parts or the scoring of the valve plates and the seats with which they cooperate, means are provided for releasably latching the rotatable core member 5 to the rotatable stem member 13 and for positively preventing rotation of the core member 5 with respect to the valve body 1 when the stem member 13, upon being unlatched from the core member, turns with relation thereto. To this end a headed latch 26 is pivotally mounted on the outer end of the rotatable core member 5, preferably a short distance inwardly of the curved peripheral surfaces 8 thereof. The pivotal mounting of the latch 6 upon the rotatable member 5 may be conveniently effected by providing the member 5 with a lug 27 to which the latch is pivotally secured by a headed screw 28 having threaded engagement with the lug. The core member 5 is also preferably provided with a lug 29 which engages and thereby supports the free end of the valve latch. Rigidly fixed with respect to the valve stem member 13 and located between the eccentrics 24 and 25 and the outer end of said stem is an arcuate member 30 which is preferably of plate-like form and whose periphery is circularly curved with the axis of the valve stem as center. Whenever the curved outer margin of the arcuate member 30 overlappingly engages the inner face of the headed end of the pivoted latch 26 the latch is positively prevented from swinging inwardly toward the axis of the core member and that of the valve stem. In addition to cooperating with the arcuate member 30 carried by the valve stem the pivoted latch 26 also cooperates with a circularly curved segmental flange 31 formed on the inner face of the cover 32 of the valve body, the segmental flange 31 preferably being fashioned as an extension of the cylindrical portion of the cover 32 which fits into the chamber 4 of the valve body. As will be seen from Figures 4, 6 and 8, so long as the free end of the pivoted latch 26 is in contact with the inner curved surface of the segmental flange 31 the latch cannot swing outwardly; and it can only swing outwardly when its headed end reaches a position (see Figure 6) permitting it to move into engagement with the shoulder 33 formed by one end of the segmental flange 31. Upon the latch being shifted outwardly into engagement with the shoulder 33 by reason of the continued movement of the valve stem 4 and its arcuate member 30 after the head of the latch has arrived at a position where it may swing outwardly, the valve stem member is released from latching connection with the core and it may rotate with respect thereto. To positively arrest rotation of the core member 5 with respect to the valve body when the latch 26 has reached proper position for moving outwardly, as well as to arrest the rotation of the member 5 with certainty at the proper point in its closing operation, the rotatable member 5 is provided on the end adjacent the cover plate 32 of the valve body with a stop lug 34 which is adapted to engage the shouldered end 35 of the segmental flange 31 of the cover. This lug 34 also is adapted to engage a lug or shoulder 36 with which the cover member 32 is provided on its inner side, the lug 36 being spaced circularly from the end 35 of the segmental flange 31 a distance corresponding to the extent of turning movement of the core member 5. The turning movement of the member 5 is thereby positively limited in both opening and closing of the valve. The stop lug 34 with which the rotatable member 5 is provided is also preferably employed as a means for arresting the closing rotation of the valve stem 13 before the curved periphery of the arcuate member carried by the stem passes beyond the free end of the pivoted latch 26, thereby insuring the engagement of the headed end of the latch with the shoulder 33 of the segmental flange 31 at the end of the closing movement of the valve and thus positively locking the rotatable core member 5 against an opening rotation at the beginning of the opening rotation of the valve stem. For this purpose the lug 34 is preferably formed with a portion 37 which engages the shouldered end 38 of the arcuate member 30 carried by the valve stem (see Figure 8) when the valve is fully closed. During an opening rotation of the valve stem the other end or shoulder 39 of the arcuate member 30 comes into engagement with the portion 37 of the stop lug 34 and, upon so doing, the opening rotation of the stem 13 is communicated to the rotatable core member 5.

The cover 32 is preferably held against rotation with respect to the valve body 1 by a key 40 which is received in suitable slots formed on the exterior of those parts. As an advantageous means for securing the cover 32 to the valve body 1 it is preferred to provide said members with tapering annular flanges 41 and 42 respectively which are embraced by a plurality of segmental circularly curved clamps or clips 43 provided with tapering channels for receiving the tapered flanges 41 and 42. The outer surfaces of the channeled clamp members 43 are conical, their greatest diameter being adjacent the valve body. Encircling the conical segmental members 43 is a clamping ring 44 which is tapered upon its interior to conform to the taper of the adjacent surfaces of the segmental clamp members. When the clamping ring 44 is forced over the segmental clamp members 43 the latter are forced against the tapering flanges 41 and 42 respectively of the valve cover and valve body and the cover 32 is thereby held securely in place. This construction is especially advantageous in that it permits the cover 32 to be removed without requiring the use of any special tools. The cover 32 of the valve body is preferably formed on its interior with a centrally disposed perforated boss 45 which engages the arcuate member 30 carried by the valve stem. As the member 30 overlaps the links 23, which are interposed between the member 30 and the rotatable core member 5, the movable parts of the valve are prevented from shifting axially with respect to the valve body 1 when the device is assembled.

Figure 1:
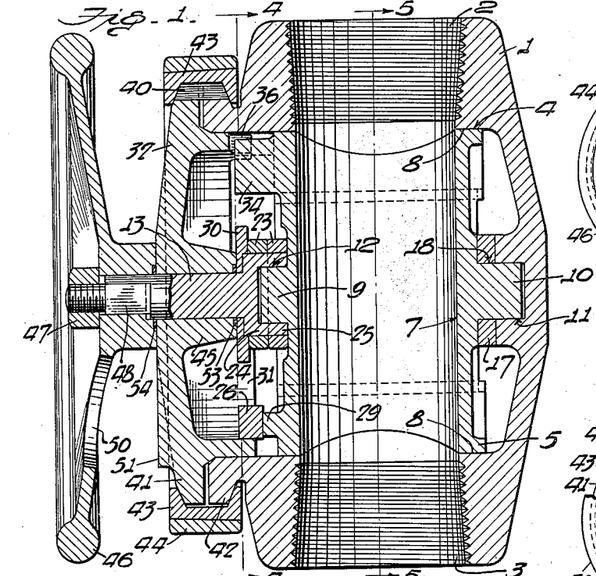
Figure 1 is a sectional view of a valve embodying the invention, the parts being shown in the relation they occupy when the valve is fully open.
Figure 2:
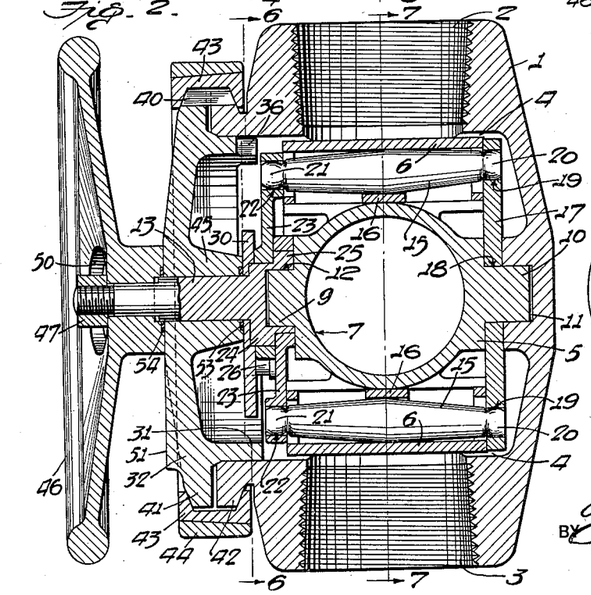
Figure 2 is a sectional view of the construction shown in Figure 1, illustrating a position of the parts in which the valve plates are in alinement with the openings of the valve body but are out of sealing contact with the valve body.
Figure 3:
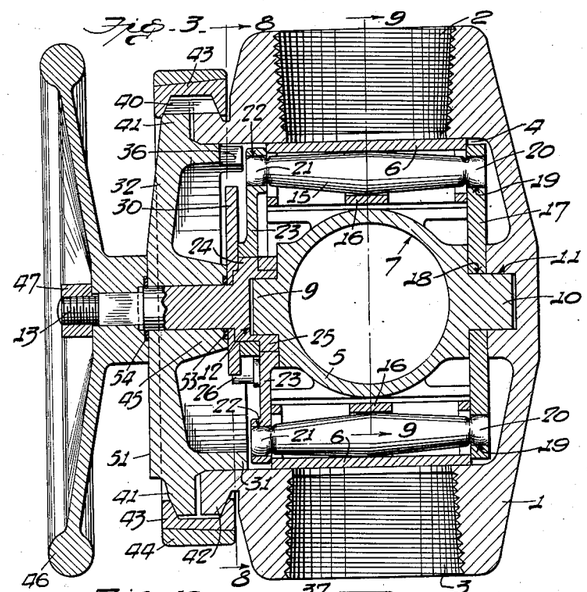
Figure 3 is a sectional view of the construction shown in Figures 1 and 2, but illustrating the positions assumed by the parts when the valve is fully closed.
Figure 4:
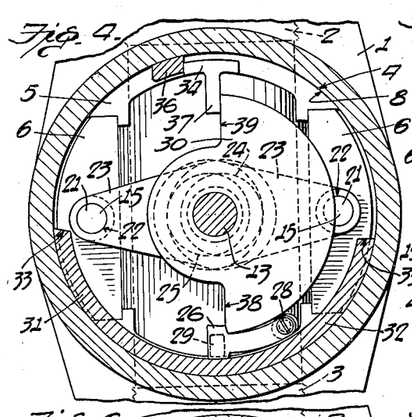
Figures 4 and 5 are sectional views respectively taken on the lines 4—4 and 5—5, Figure 1.
Figure 5:
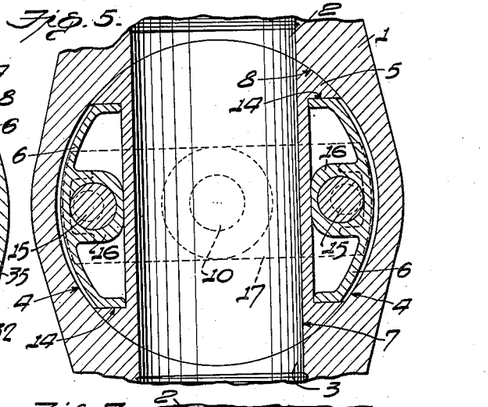
Figure 6:
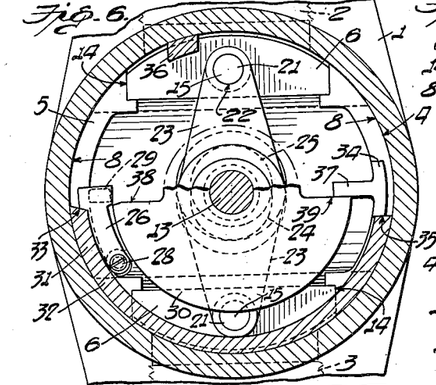
Figures 6 and 7 are sectional views on the lines 6—6 and 7—7, respectively, of Figure 2.
Figure 7:
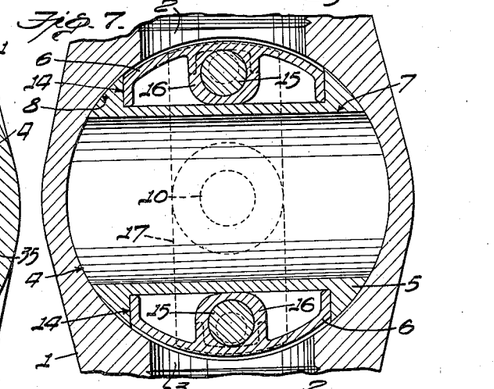
Figure 8:
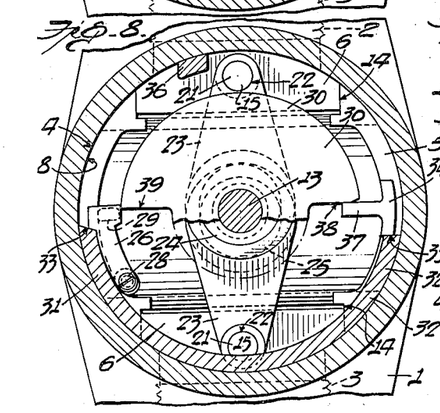
Figures 8 and 9 are sectional views respectively taken on the lines 8—8 and 9—9, Figure 3.
Figure 9:
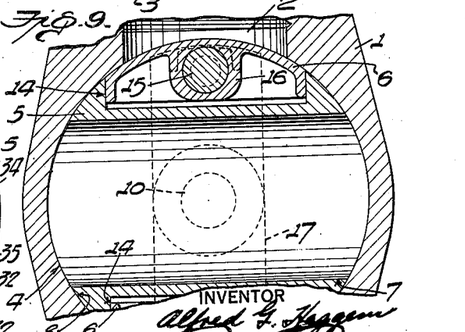
Figures 10, 11, 14, 15:
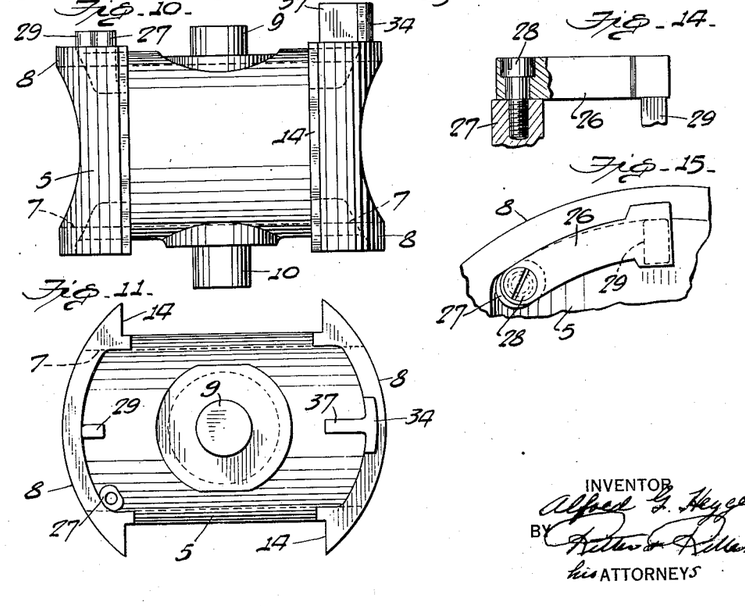
Figures 10 and 11 are detail elevational views of the rotatable member upon which the valve plates are mounted.
Figures 14 and 15 are detail views showing the relation of the movable latch to the rotatable member upon which the valve plates are mounted, Figure 14 being partly in elevation and partly in section and Figure 15 being in elevation.
Figure 12:
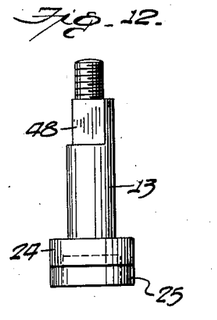
Figures 12 and 13 are detail elevational views of the valve stem member and associated eccentrics.
Figure 13:
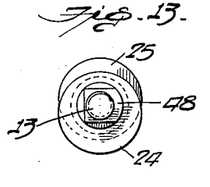

A hand wheel 46 is mounted upon the outer end of the valve stem 13 for actuating the latter. It is secured to the stem by means of a nut 47 having threaded engagement with the upper end of the stem. By tightening up the nut 47 the core member 5 may be locked against rotation in any position corresponding to any desired degree of opening or closing of the valve. The portion 48 of the valve stem which fits into a corresponding opening in the hand wheel is unsymmetrical in cross section, having, as shown, a curved face as well as flat faces. This enables the turning movement of the hand wheel to be communicated to the valve stem 13 and at the same time insures that the hand wheel will always be assembled in the same angular position with respect to the stem. The central web of the hand wheel is provided with an opening 50 which is preferably circular in form so as to correspond to the shape of the inlet and outlet openings or ports, 2 and 3 respectively, of the valve body. On the outer surface of the cover member 32 are spaced corresponding circles 51 and 52 respectively. When the hand wheel 46 is in the position causing the circles 50 and 51 to be in register with each other axially of the valve stem (see Figure 16) the valve is fully open as shown in Figures 1, 4 and 5. When the circle 50 of the hand wheel is similarly in register with the circle 52 (see Figure 18) the valve is fully closed as illustrated in Figures 3, 8 and 9. In the intermediate position of the valve parts illustrated in Figures 2, 6 and 7, the circle 50 of the hand wheel (see Figure 17) does not overlap either of the circles 51 and 52 upon the exterior of the cover. By this means it is possible to ascertain by mere inspection whether the valve is fully opened or fully closed; and it is also possible to tell to what extent the valve may be opened, if it be not fully opened, for the extent to which the circular opening 50 of the hand wheel overlaps the circular opening 51 is a visual indication of the extent to which the inlet and outlet ports 2 and 3 respectively of the valve body are not covered by the valve plates 6. The ability thus to determine the extent of opening of the valve is particularly advantageous where the valves are to be used for controlling liquids of different kinds which it is desired to mix in certain proportions. Within the circle 51 it is preferred to have the word "open" appear, while within the circle 52 the word "shut" preferably appears. The inner end of the perforated boss 45 on the interior of the cover member 32 is preferably recessed to receive a suitable packing ring 53 which encircles the valve stem and is interposed between the cover and the arcuate member 30 secured to the valve stem. Similarly the inner end of the hub of the hand wheel 46 is preferably recessed to receive a suitable packing ring 54 which encircles the valve stem 14 and is interposed between the hand wheel and the cover 32 of the valve body.

The operation of the form of the invention heretofore described is as follows: Assuming the valve to be fully open, as shown in Figures 1, 4 and 5, rotation of the hand wheel 46 to impart a clockwise turning movement to the valve stem 13 (as viewed in Figure 4), will cause a corresponding turning movement of the arcuate member 30 secured to the stem. As the end face or shoulder 38 of the member 30 is at this time in overlapping engagement with the headed end of the pivoted latch 26, the latter is caused to rotate and effect a corresponding rotation of the core member 5 upon which it is pivotally mounted. When this clockwise rotation of the latch 26 and the rotatable member 5 upon which it is pivotally mounted has proceeded to the point where the headed end of the latch reaches the end 33 of the segmental flange 31 of the cover against which it rides (see Figure 6), the projecting stop lug 34 of the core member 5 comes into contact with the opposite end 35 of the segmental flange 31 and further rotation of the member 5 with respect to the valve body 1 in a valve closing direction is thereby arrested. Upon the rotation of the member 5 being arrested the continued rotation of the valve stem and the arcuate member 30 causes the latter to press against the headed end of the latch 26 so as to swing it outwardly into engagement with the end or shoulder 33 of the segmental flange 31 of the valve cover, thus unlatching the valve stem from the rotatable core member 5 and permitting the stem to continue its rotation in the valve closing direction. When the headed end of the latch 26 is in engagement with the shoulder 33 the circularly curved periphery of the arcuate member 30 carried by the valve stem 13 rides along the inner side of the free end of the latch 26 during the remainder of the valve closing rotation of the stem. Being in contact with the circularly curved periphery of the arcuate member 30 during the remainder of the valve closing rotation of the valve stem 13, the headed end of the latch 26 is restrained against moving out of engagement with the shoulder 33 at the end of the segmental flange 31 of the valve body cover and, therefore, the rotatable core member 5 is positively held against rotation in either direction, its rotation counterclockwise being prevented by the engagement of the latch 26 with the shoulder 23 and its rotation in a clockwise direction being prevented by the engagement of the stop lug 34 with the shoulder 35 at the end of the segmental flange 31.

Until the rotatable core 5 is fully turned to the position it occupies when the valve is closed the valve stem 13 and the member 5 rotate together as one and, therefore, the eccentrics 24 and 25 cause no shifting of the links 23 by which movement of the levers 15 is effected. Consequently the valve plates 6 remain stationary with respect to the core member 5 and in retracted position until (see Figures 6 and 7) they fully overlap the respective openings 2 and 3 of the valve body. By this means scoring of the valve plates 6 due to a turning movement thereof with respect to the valve body is entirely prevented. When the valve plates have come into axial alinement with the openings 2 and 3 of the valve body the continued clockwise or closing rotation of the valve stem causes the eccentrics 24 and 25 to actuate their respectively cooperating links 23 and as a result the levers 15 rock upon the fulcrum points provided therefor by the inner bar or link member 17. This rocking of the levers forces the valve plates to move radially outward into firm contact with their seats on the valve body, as shown in Figures 3, 8 and 9. If desired the valve may be designed so that the valve plates 6 reach fully closed position slightly before the shouldered end 38 of the arcuate member 30 engages the portion 37 of the stop lug 34 carried by the rotatable core 5.

The operation of the parts when the valve is being opened is as follows: Assuming the parts to be in closed position, as illustrated in Figures 3, 8 and 9, counterclockwise rotation of the valve stem 13 (as viewed in Figure 8) causes the eccentrics 24 and 25 of the valve stem to actuate the links 23 so as to rock the levers 15. This rocking movement of the levers, which is wholly performed while the rotatable core member 5 remains locked against rotation with respect to the valve body, positively retracts the valve plates 6 from their seats on the valve body, moving them radially inward until they assume the positions shown in Figures 2, 6 and 7. At the completion of the retractile radial movement of the valve plates the end 38 of the arcuate member 30 reaches a position such that the head of the pivoted latch 26 is no longer in contact with the curved periphery of the member 30; and at the same time the end 39 of said member 30 comes into contact with the portion 37 of the stop lug 34 with which the rotatable member 5 is provided.

The opening rotation of the stem is thereupon communicated to the core member 5 through the engagement of the arcuate member 30 and lug 34, such movement of the member 5 causing the pivoted latch to shift inwardly, thus releasing it from locking engagement with the shoulder 33 at the end of the segmental flange 31 formed on the valve cover and causing its headed end to have shouldered engagement with the end face 38 of the arcuate plate 30. The final opening rotation of the valve stem causes the rotatable member 5 to perform a corresponding rotation which continues until the stop lug 34 engages the stop lug 36 on the interior of the cover 32 of the valve body, the parts of the valve then being in fully open position illustrated in Figures 1, 4 and 5.

The modified form of construction illustrated in Figures 19 to 31 inclusive is generally similar to the construction heretofore described but primarily differs therefrom in that it employs but a single valve plate instead of a plurality of valve plates. While the modified form of construction is capable of embodiment in valves of all sizes, it is especially suitable for comparatively small valves.

The valve body 55 of the modified form of construction is provided with an inlet opening 56 and an outlet opening 57 which are in communication with each other through a cylindrical chamber 58 formed in the valve body. The cylindrical chamber 58, unlike the corresponding chamber 4 in the valve body 1, preferably is disposed eccentric to the axis of the openings 56 and 57 for the passage of fluid, that is to say, the axis of the cylindrical chamber 58 extends at an angle to the axis of at least one of said openings and does not intersect said last-named axis but is spaced therefrom. Except for the positioning of the chamber 58 and the provision of an annular recess 59 for receiving a packing 60 which is interposed between the valve body and its cover member 61 the valve bodies 1 and 55 are of substantially the same construction and, accordingly similar features thereof have been indicated by corresponding reference numerals.

Within the cylindrical chamber 58 of the valve body is a rotatable core member 62 formed with a passage 63 affording communication between the openings 56 and 57 when the valve is open. Instead of being formed with a plurality of recesses 14 for receiving a corresponding number of valve plates, as is the case in the construction heretofore described, the rotatable core 62 is formed with but one such recess and arranged in it is the valve plate 64 which is designed to close the inlet opening 56 of the valve body. As in the case of the rotatable member 5, the rotatable core 62 may advantageously be formed with oppositely disposed trunnions 65 and 66 respectively, the former fitting into a corresponding cylindrical socket in the valve body and the latter extending into a socket 67 provided therefor in the lower end of the valve stem 68. The outer trunnion 66 is preferably made of a length such that the hub 69 on the inner side of the cover member 61 through which the valve stem extends overlaps it in the direction of length of said trunnion. By this means the tendency of the rotatable core member 62 to tilt as a result of fluid pressure applied to the single valve plate is efficiently counteracted, since the lateral thrust upon the outer trunnion 66 is transferred directly from the socketed valve stem to the overlapping hub 69 of the cover and thence to the valve body. The rotatable member 62 is provided on one end with a projecting lug 70 corresponding in function to the stop lug 34 with which the rotatable core 5 heretofore described is provided; and the member 62 is likewise provided with a lug 27 serving as a mounting for the pivoted latch 26 and with a lug 29 for supporting the outer end of said latch. The lugs 27 and 29 may, as shown, be identical with the corresponding details of construction heretofore described. Except as otherwise described, the rotatable member 62 is substantially like the rotatable member 5, it being noted, however, that the arcuate peripheral surfaces 8 are of somewhat greater extent in the case of the core member 62 than in the case of the rotatable member 5. In respect to both forms of the core members it is to be noted that the arcuate surfaces 8 thereof meet each valve receiving recess 14 at an acute angle to form a knife edge which efficiently functions to clean the valve seat or seats, as the case may be, when the core member is rotated.

The cover 61 of the valve body is provided on its inner side with a segmental circular flange 71 with which the latch 26 cooperates in the manner heretofore described. The segmental flange 71 is of somewhat less length than the segmental flange 31 but it is in effect lengthened by the provision on the cover 61 of a stop lug 72 which cooperates with the lug 70 of the core member 62 in precisely the same way that the end 35 of the segmental flange 31 cooperates with the lug 34 of the rotatable core member 5 heretofore described. The cover member 61 is also provided on its inner side with a stop lug 73 corresponding to the similar lug 36 heretofore described. The stop lug 72 by cooperating with the lug 70 limits the closing rotation of the core member 62, while the stop 73 by cooperating with said lug 70 limits the opening rotation of the core member.

Since the modified form of construction employs but a single valve plate 64 the valve stem 68 is provided with a single eccentric 74 which cooperates with a link 75 whose outer end cooperates with the valve operating lever 76, which latter is preferably identically like the valve operating levers 15 illustrated in the principal figures of the drawings. The fulcrum for the inner end of the lever 76 is preferably provided by a link or bar 77 which is formed with an eye for receiving the trunnion 65 of the rotatable core member and which is interposed between said core member and the valve body.

As particularly shown in Figures 28 to 31 inclusive, the valve plate 64 is provided with a cylindrically curved surface 78 for cooperating with the valve body and its sides 79 are parallel with each other and with the axis of the cylindrical chamber 58 of the valve body; and adjacent opposite ends of said parallel sides 79 the outer face of said plate is preferably formed with bevelled faces 80 which intersect the cylindrically curved surfaces 78. The radial distance of the corners of the valve plate 64 from the center of curvature of the cylindrical surface 78 is thus made less than the radius of curvature of the cylindrical surface 78 which cooperates with the valve body. By this means is overcome any tendency of the valve plate to seat unevenly against the valve body by reason of a corner or corners of the plate coming into contact with the valve body in advance of other corners of the plate. The cylindrical surface 78 of the valve instead of being unyielding may, if desired, be formed as a yielding facing 81 of rubber, thiokol, or the like. As the movements of the valve plate 64 toward and from the valve body are radial with respect to the core member 62 and are unaccompanied by any rotation with respect to the valve body, there is no tendency to tear the yielding facing 81 or to strip it from the valve plate during the opening or closing of the valve.

As a means for packing the valve stem 68 it is preferred to employ one or more yielding packing rings 82 of triangular cross section. These packing rings, which may advantageously be made of rubber have a normal interior diameter which is slightly greater than the diameter of the portion of the valve stem which they encircle and each provides a plurality of packing faces, one of which cooperates with the valve stem 68 and the other with the valve cover 61, said packing faces being disposed so as to form an acute angle between them. The hub portion 69 of the valve cover is formed on its interior with spaced annular grooves or recesses 83 for receiving the respective packing rings 82, said grooves being of the same general triangular form as the packing rings but having at the intersection of their inclined sides an enlargement or extension 84 and being somewhat rounded or increasingly flared immediately adjacent the valve stem, as indicated at 85 (see Fig. 27). The enlargements 84 of the grooves for receiving the packings 82 provide space into which the packing rings may yield when subjected to the pressure of the fluid to be packed, while the beveling or flaring 85 at the inner margin of the grooves permits the respectively adjacent acute ends of the packing rings to wedge firmly between the valve stem and the hub 69 of the valve cover. By this means the triangular packing rings 82 are caused to slip slightly outwardly along the valve stem 68 under the influence of any fluid pressure to which they are subjected and to be compressed and wedged firmly between the valve stem and valve cover.

The arcuate member 86 which functions like the corresponding member 30 heretofore described, instead of being rigidly secured to but removable from the valve stem after the fashion of mounting the member 30 upon its valve stem 13, is preferably formed integral with the valve stem 68, such form of construction being permitted by reason of the employment of a single eccentric. The ends or shoulders 87 and 88 with which the arcuate member 86 is provided respectively function like the shouldered ends 38 and 39 of the arcuate member 30 employed in the embodiment of the invention using a plurality of valve plates. Except as heretofore described, other features of construction of the modified form of the invention illustrated in Figures 19 to 31 inclusive of the drawings are similar in form and function to corresponding features embodied in the form of the invention illustrated in Figures 1 to 18 inclusive and heretofore described and, accordingly, such corresponding features have been identified by corresponding reference numerals.

Figure 19:
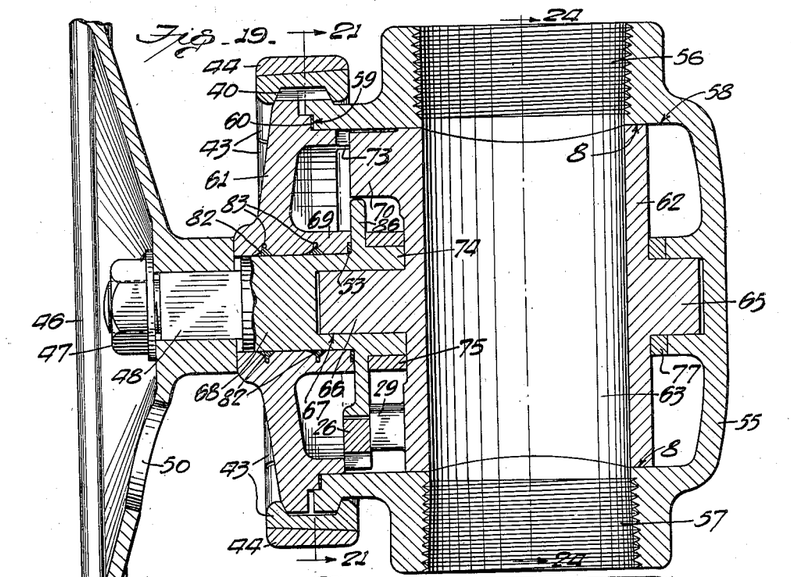
Figure 19 is a sectional view of a modified form of valve embodying the invention, the parts being shown in the positions they occupy when the valve is fully open.
Figure 20:
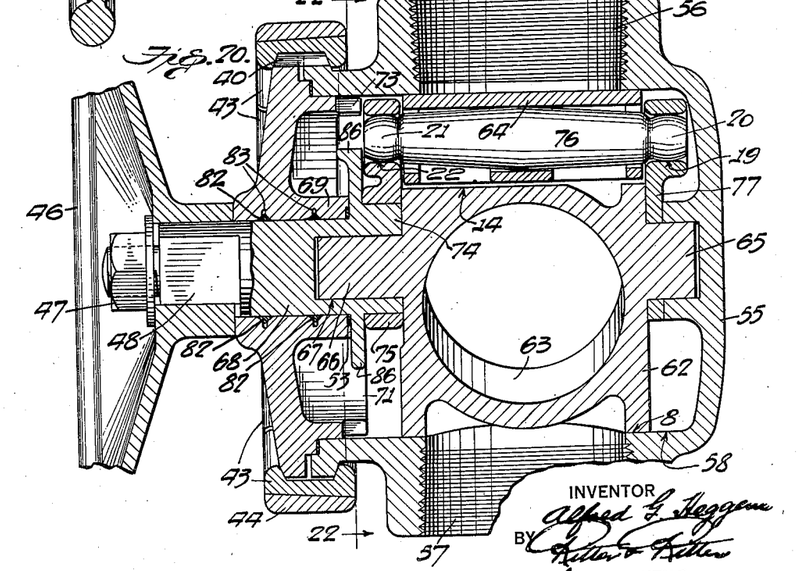
Figure 20 is a view corresponding to Figure 19 but illustrating the positions assumed by the parts when the valve is fully closed.
Figures 21, 22, 23:
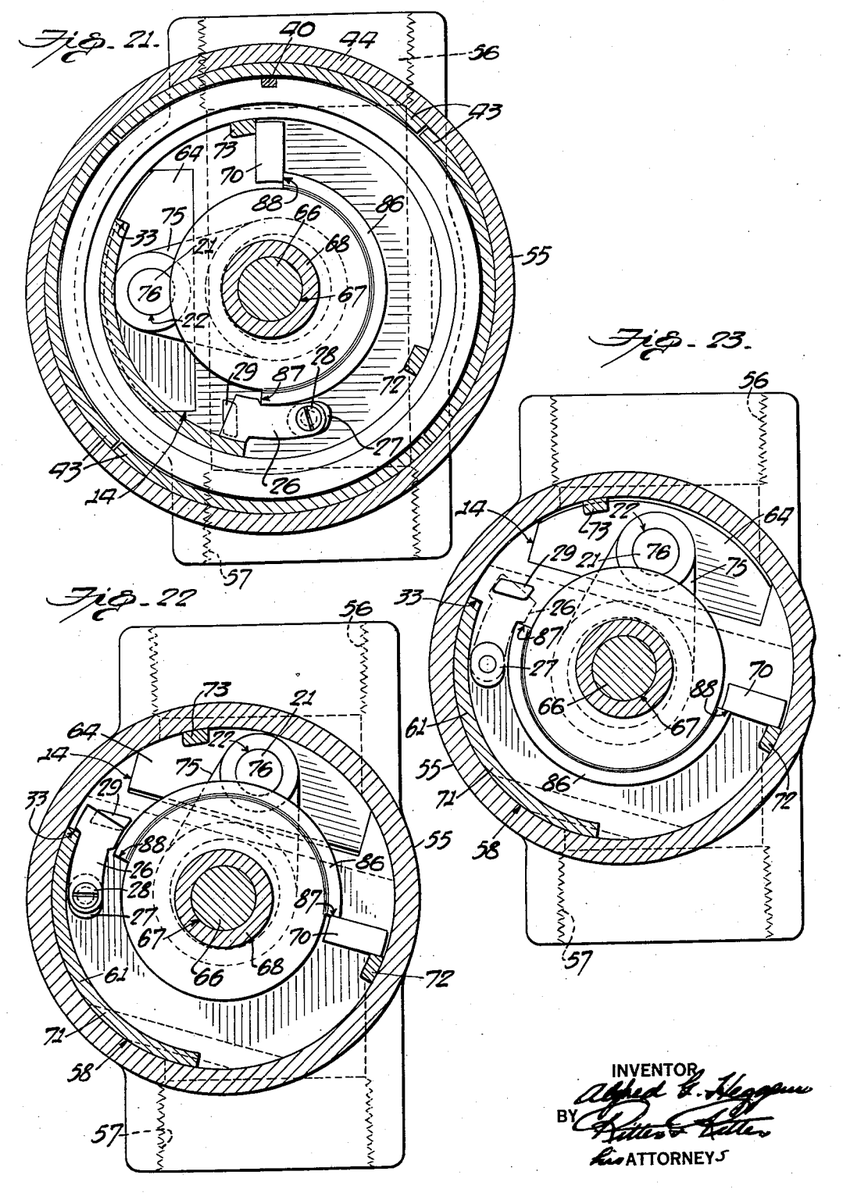
Figure 21 is a sectional view on the line 21—21, Figure 19.
Figure 22 is a sectional view on the line 22—22, Figure 20.
Figure 23 is a view corresponding to Figures 21 and 22 but showing the parts in the positions they occupy when the valve plate is out of contact with the valve body while in overlapping relation to the fluid passage thereof, and also showing, by dot and dash lines, the relation of the movable latch to its cooperating parts.

The operation of the form of valve in which a single valve plate is employed is identical with the mode of operation of the construction involving a plurality of valve plates and, therefore, need only be briefly described. Assuming the valve to be in open position as illustrated in Figures 19 and 21, the closing rotation of the valve stem 68 imparts a corresponding rotation to the arcuate member 86 carried thereby and thus, by the cooperation of the shoulder 87 of the member 86 with the headed latch 26 mounted upon the rotatable core member 62, turns the core member until its stop lug 70 comes into contact with the lug 72 of the valve cover. After the closing rotation of the valve core with respect to the valve body has thus been arrested, the continued closing rotation of the valve stem 68 causes the headed end of the pivoted latch 26 to swing outwardly in overlapping relation with the end or shoulder 33 of the segmental flange 71 of the valve cover, thus allowing the closing rotation of the valve stem to proceed. During this closing rotation of the stem with respect to the valve core the eccentric 74 cooperates with the link 75 so as to rock the lever 76 outwardly and force the valve plate 64 to sealing contact with the valve body, the parts finally assuming the position illustrated in Figure 22. In opening the valve the initial rotation of the valve stem 68 is performed while the rotatable core member 62 is positively held against rotation both by the latch 26 and the stop lug 72. During this initial opening rotation of the valve stem the valve plate 64 is withdrawn radially from contact with the valve body, such operation being accomplished by the cooperation of the eccentric 74, the link 75 and the lever 76. At the completion of this retractile movement of the valve plate the end 87 of the arcuate member 86 reaches a position permitting the latch 26 to swing inwardly while the end 88 of said arcuate member comes into contact with the lug 70 of the rotatable core member 62. Further closing rotation of the valve stem thereupon rotates the core member with respect to the valve body, the latch 26 swinging inwardly out of locking engagement with the shoulder 33 at the end of the segmental flange 71 as the opening rotation of the core member is initiated. When the lug 70 of the rotatable member 62 comes into contact with the stop lug 73 on the interior of the valve cover 61 further rotation of the movable parts of the valve with respect to the valve body is arrested and the valve is fully open as illustrated in Figures 19 and 21.

Since the form of valve involving a plurality of valve plates presents a duplication of features embodied in the form of valve employing a single valve plate, it is to be understood that valves embodying more than one valve plate are comprehended within the scope of claims defining the invention in terms of the relation of one valve plate to its cooperating parts.

I claim:

1. A valve involving a valve body having an inlet opening and an outlet opening and a chamber communicating with said openings, and means for controlling the flow of fluid through said openings, said means including a rotatable member disposed within said chamber, a valve plate mounted on said rotatable member and radially movable with respect thereto, a stem rotatable with respect to said rotatable member and the valve body, a lever for moving said valve plate radially with respect to said rotatable member, a plurality of spaced links respectively cooperating with the lever, and an eccentric cooperating with one of said links and rotatable by by the rotation of said stem, said valve plate being disposed between said links.

2. A valve involving a valve body having an inlet opening and an outlet opening and a chamber communicating with said openings, and means for controlling the flow of fluid through said openings, said means including a rotatable member disposed within said chamber, a valve plate movable with said rotatable member and radially movable with respect thereto, a stem rotatable with respect to said rotatable member and the valve body, means controlled by the rotation of said stem for actuating said rotatable member, a lever for moving said valve plate radially with respect to said rotatable member, a plurality of spaced links respectively cooperating with the lever, and an eccentric cooperating with one of said links and movable upon rotation of said stem with respect to said rotatable member, said valve plate being disposed between said links and said lever being enlarged between its ends for rocking cooperation with said valve plate and having curved surfaces at its ends for movably cooperating with said links.

3. A valve involving a valve body having an inlet opening and an outlet opening and a chamber communicating with said openings, and means for controlling the flow of fluid through said openings, said means including a rotatable member disposed within said chamber, a valve plate rotatable with said rotatable member and radially movable with respect thereto, a stem rotatable with respect to said rotatable member and the valve body, means for releasably latching said stem to said rotatable member, a lever for moving said valve plate radially in opposite directions with respect to said rotatable member, a plurality of spaced links respectively cooperating with the lever, and an eccentric cooperating with one of said links and rotatable with said stem, said valve plate being disposed between said links, and said lever having rocking cooperation with the valve plate at a point intermediate the ends of said lever.

4. A valve involving a valve body having an inlet opening and an outlet opening and a chamber communicating with said openings, and means for controlling the flow of fluid through said openings, said means including a rotatable member provided with a trunnion, a valve plate carried by said rotatable member and movable radially with respect to said valve body and said rotatable member, a stem rotatable with respect to said rotatable member, said stem being formed with a socket to receive said trunnion and being provided with an eccentric at the end at which said socket is located, means actuated by said eccentric for moving said valve plate radially with respect to said rotatable member, a latch movably mounted on said rotatable member for preventing rotation of the latter with respect to the valve body, and means movable with said stem and located between said eccentric and the outer end of the valve stem for cooperating with said latch to maintain the latter in a position preventing rotation of said rotatable member with respect to the valve body during radial movement of said valve plate with respect to the said rotatable member.

5. A valve involving a valve body having an inlet opening and an outlet opening and a chamber communicating with said openings, a rotatable member disposed within said chamber and provided with a trunnion, a valve plate rotatable with and movable with respect to said rotatable member, a rotatable stem having a socket for said trunnion and provided at its inner end with an eccentric, said stem being rotatable with respect to the valve body and to said rotatable member, means actuated by said eccentric for moving said valve plate with respect to said rotatable member, and means for releasably locking said rotatable member to the valve body, said last-named means including arcuate means concentric with said stem, and a movable locking device carried by said rotatable member and cooperating with said arcuate means, said arcuate means being rigidly fixed with respect to said stem and being located between said eccentric and the outer end of said stem.

6. A valve involving a valve body having an inlet opening and an outlet opening and a chamber communicating with said openings, and means for controlling the flow of fluid through said openings, said chamber having cylindrically curved walls adjacent said openings, and said means including a rotatable member disposed within said chamber, a valve plate mounted on said rotatable member and radially movable with respect thereto, a stem rotatable with respect to said rotatable member and to the valve body, means for releasably locking the stem to said rotatable member, and means actuated upon the rotation of said stem with respect to said rotatable member for shifting the valve plate radially, said valve plate having a cylindrically curved surface for cooperating with the valve body and being formed with sides parallel with the axis of said chamber and with each other and being provided adjacent opposite ends of said parallel sides with bevelled faces which intersect said cylindrically curved surface thereof.

7. A valve involving a valve body having an inlet opening and an outlet opening and a chamber communicating with said openings, and means for controlling the flow of fluid through said openings, said means including a rotatable member disposed within said chamber, a valve plate mounted on said rotatable member and radially movable with respect thereto, a stem rotatable with respect to said rotatable member and to the valve body, means for releasably locking said stem to said rotatable member, means actuated by said stem for moving the valve plate radially with respect to said rotatable member while the latter is at rest with respect to said valve body, and means interposed between said rotatable member and the valve body for spacing the inner end of the valve plate away from said body.

8. A valve involving a valve body having an inlet opening and an outlet opening and a chamber communicating with said openings, and means for controlling the flow of fluid through said openings, said body being provided with a cover member, and said means including a rotatable member, and a stem member for actuating said rotatable member, said stem member being of circular cross-section and projecting outwardly through an opening in said cover member, and a yielding packing ring of substantially triangular cross-sectional form encircling said stem and interposed between the latter and said cover, said ring having a normal interior diameter greater than the diameter of the adjacent portion of said stem, and said cover member being provided with an annular groove for receiving said ring, said groove having sides which extend at an acute angle to the axis of said stem and being formed with an enlargement at the intersection of said sides with each other.

ALFRED G. HEGGEM.